(12) United States Patent
Ishibe

(10) Patent No.: US 6,989,855 B2
(45) Date of Patent: Jan. 24, 2006

(54) MULTI-BEAM SCANNING OPTICAL SYSTEM, MULTI-BEAM SCANNING OPTICAL APPARATUS, AND IMAGE FORMING APPARATUS

(75) Inventor: Yoshihiro Ishibe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/967,965

(22) Filed: Oct. 2, 2001

(65) Prior Publication Data

US 2002/0063910 A1 May 30, 2002

(30) Foreign Application Priority Data

Oct. 10, 2000 (JP) ........................................ 2000-309245

(51) Int. Cl.
*B41J 27/00* (2006.01)

(52) U.S. Cl. ...................................................... 347/244
(58) Field of Classification Search .................. 347/134, 347/230, 244, 258; 353/38; 355/67; 359/432–434, 359/672–673, 739; 372/103
See application file for complete search history.

(56) References Cited

U.S. PATENT DOCUMENTS

| 5,463,418 | A | | 10/1995 | Tateoka | 347/244 |
|---|---|---|---|---|---|
| 5,717,511 | A | * | 2/1998 | Suzuki | 359/204 |
| 5,805,199 | A | | 9/1998 | Aoki | 347/256 |
| 5,959,759 | A | * | 9/1999 | Hamada | 359/204 |
| 6,061,080 | A | | 5/2000 | Harris | 347/243 |
| 6,256,132 | B1 | | 7/2001 | Ishibe | 359/204 |

FOREIGN PATENT DOCUMENTS

| EP | 0 661 573 | 7/1995 |
|---|---|---|
| EP | 1 011 003 | 6/2000 |
| JP | 9-61737 | 3/1997 |
| JP | 9-138363 | 5/1997 |

* cited by examiner

*Primary Examiner*—Hai Pham
(74) *Attorney, Agent, or Firm*—Fitzpatrick, Cella, Harper & Scinto

(57) ABSTRACT

A multi-beam light scanning optical system has a light beam incident optical system for causing a condenser lens to condense each of light beams emitted from a plurality of light sources and making the light beams incident on a deflecting surface of an optical deflector. In the light beam incident optical system, a relay optical system is inserted between the plurality of light sources and the condenser lens. An aperture stop for limiting a beam width of each of the light beams emitted from the plurality of light sources is arranged on a light source side with respect to an image forming point of each of the plurality of light sources through the relay optical system.

33 Claims, 10 Drawing Sheets

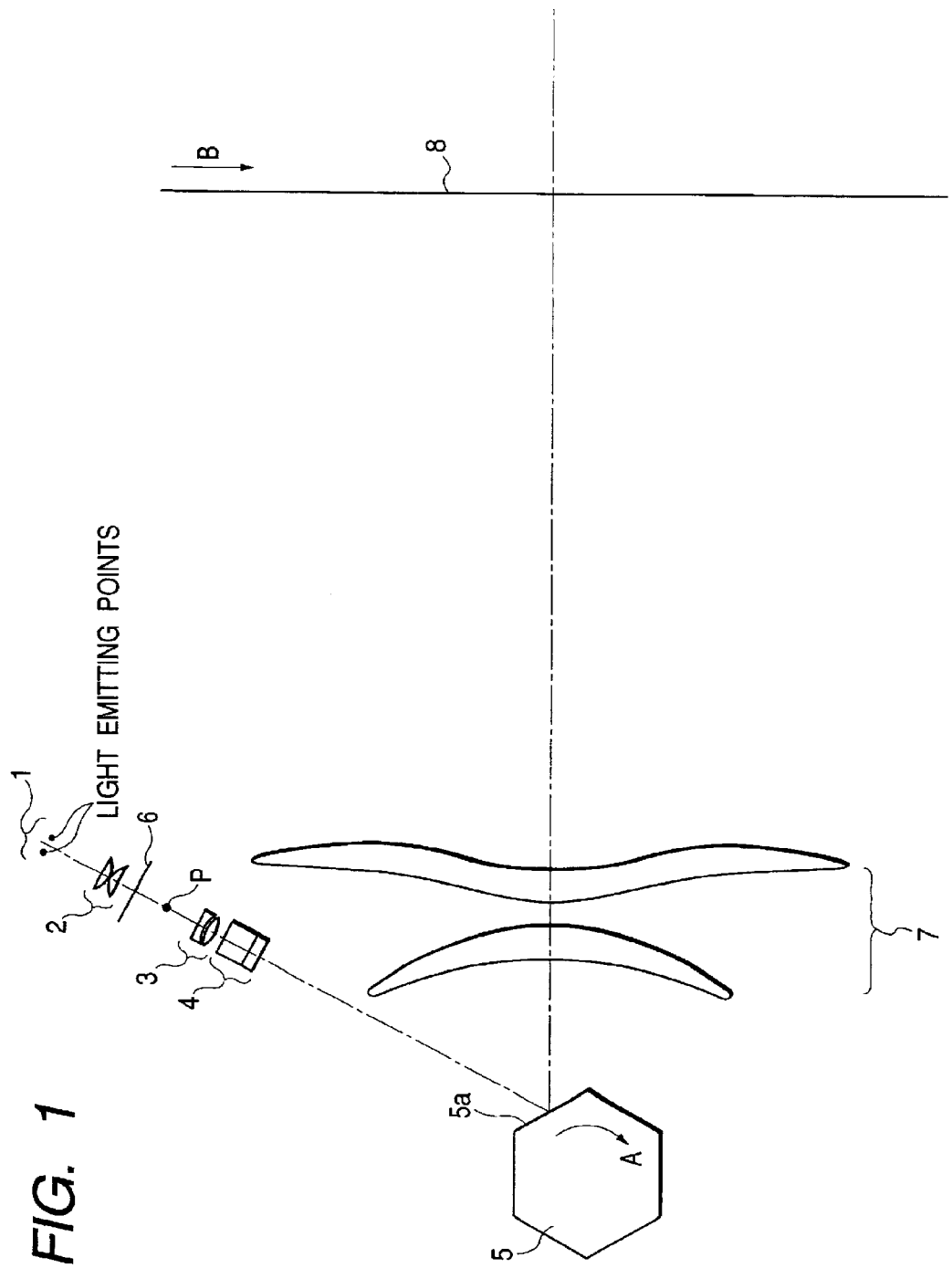

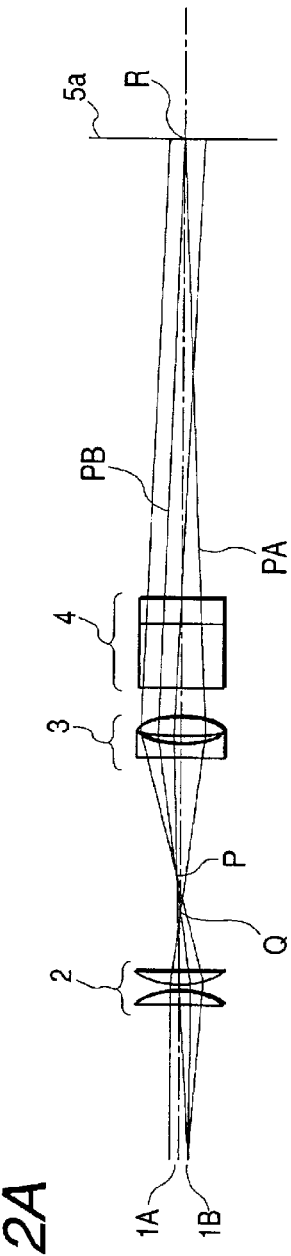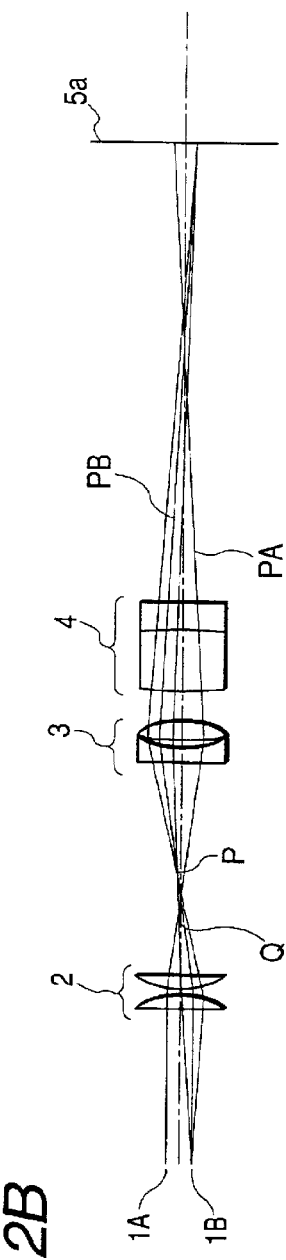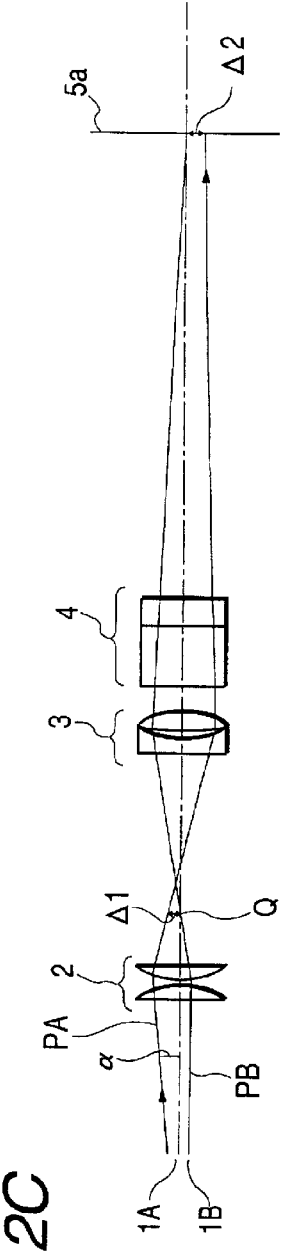

MULTI-BEAM SCANNING OPTICAL SYSTEM, MULTI-BEAM SCANNING OPTICAL APPARATUS, AND IMAGE FORMING APPARATUS

BACKGROUND OF THE INVENTION

1. Field of the Invention

The present invention relates to a light scanning optical system and image forming apparatus using the same, and a light scanning optical system and light scanning optical apparatus used for a laser beam printer or digital copying machine and, more particularly, to a multi-beam light scanning optical system which uses a plurality of light sources as a light source to achieve high-speed operation and high recording density, and an image forming apparatus using the multi-beam light scanning optical system.

2. Related Background Art

FIG. 9 shows the main scanning section of a conventional multi-beam light scanning optical system using a plurality of light sources. A plurality of light sources 21 are formed from a semiconductor laser having a plurality of light emitting points. Each of light beams emitted from the plurality of light sources is converted into a substantially parallel beam or convergent beam by a collimator lens 22. Each light beam is shaped in its sectional shape through an aperture stop 23 and converged only in the sub scanning direction by a cylindrical lens 24 so that an image like a focal line long in the main scanning direction is formed near a deflecting/reflecting surface 25a of a polygon mirror 25 serving as an optical deflector. Each light beam reflected/deflected and scanned by the polygon mirror 25 that is rotating in a direction indicated by an arrow A in FIG. 9 at a predetermined speed is focused, through an f-θ lens 26, into a spot on a surface 27 to be scanned (scanning surface 27), comprising a photosensitive drum or the like, and scanned in a direction of an arrow B in FIG. 9 at a predetermined speed. A BD optical system 28 detects a write start position. The BD optical system 28 comprises a BD slit 28a, BD lens 28b, and BD sensor (synchronous position detection element) 28c.

In such a multi-beam scanning optical system, if the plurality of light sources are laid out vertically in the sub scanning direction, as shown in FIG. 10, the sub-scanning line interval on the scanning surface becomes much more than the recording density. To avoid this, normally, a plurality of light sources are obliquely laid out, as shown in FIG. 11, and a tilt angle δ is adjusted whereby the sub-scanning line interval on the scanning surface is accurately adjusted so as to match the recording density.

In the conventional light scanning optical system having the above arrangement, the plurality of light sources are obliquely laid out. For this reason, since light beams emitted from the plurality of light sources reach the reflecting surface of the polygon mirror at positions apart in the main scanning direction, and are reflected with different reflection angles by the polygon mirror, so that spots are formed on the scanning surface at positions apart in the main scanning direction, as shown in FIG. 12 (light beam A and light beam B).

Hence, in such a multi-beam light scanning optical system, image data are sent with a delay of a predetermined time δT such that the image forming positions of light beams from the light sources match a position where a light beam from a certain reference light source forms its image on the scanning target surface.

With the delay time δT, the polygon surface is set to be a surface 25' with an angle corresponding to the delay time δT. At this time, the light beam is reflected in a direction B', i.e., in the same direction as that of the light beam A, so that the spot forming positions of the two light beams match.

Assume that a focusing error in the main scanning direction occurs due to some reason (e.g., a positional error between the scanning surface and the optical unit that holds the optical system, an assembly error in assembling optical components in the optical unit, or the like). In this case, when the scanning surface 27 shifts to a position 27', as is apparent from FIG. 12, the image forming position of each light beam shifts in the main scanning direction by δY.

Conventionally, when the image forming position of each of the light beams from the plurality of light sources shifts, as described above, the printing accuracy decreases, and the image quality degrades.

The focus shift/error in the main scanning direction occurs due to various factors, and they cannot be completely eliminated. Even a process of adjusting them requires cost. Recently, an optical system using a plastic material is often used as an f-θ lens from the viewpoint of cost. A plastic lens is manufactured by injection molding, and its surface accuracy is lower than an accuracy obtained by polishing an optical glass member. Especially, a plastic lens readily produces a convex error with respect to a design value at a portion of the lens and a concave error at another portion. A focus shift due to such a surface accuracy error cannot be corrected across the scanning target surface.

It is therefore very difficult to correct a degradation in image quality due to the image forming position shift between the light beams from the plurality of light sources.

In the above description, the number of light emitting points is 2 for simplicity. As can easily be understood, when the number of light emitting points increases to 3, 4, 5, 6, . . . , the value δY generated between light sources at two ends proportionally increases. That is, in the conventional multi-beam light scanning optical system, even when the number of light emitting points is increased to attain high-speed operation, the printing accuracy decreases, and the image quality degrades because the above-described image forming position shift between the light beams from the plurality of light sources increases, resulting in difficulty in achieving high-speed operation.

SUMMARY OF THE INVENTION

The present invention has been made to solve the above problems, and has as its object to provide a multi-beam light scanning optical system which can optimally achieve high-speed operation and high image quality by arranging a relay optical system between a plurality of light sources and a condenser lens so that any image forming position shift between light beams from the plurality of light sources can be effectively prevented without any complex adjustment, and an image forming apparatus using the multi-beam light scanning optical system.

According to the present invention, there is provided (1) a multi-beam light scanning optical system having a light beam incident optical system for causing a condenser lens to condense each of light beams emitted from a plurality of light sources and making the light beams incident on a deflecting surface of an optical deflector, wherein in the light beam incident optical system, a relay optical system is inserted between the plurality of light sources and the condenser lens, and an aperture stop for limiting a beam width of each of the light beams emitted from the plurality of light sources is arranged on a light source side with respect to an image forming point of each of the plurality of light sources through the relay optical system.

Especially, in the system, (1—1) the condenser lens is arranged to make the aperture stop substantially conjugate to the deflecting surface of the optical deflector, (1-2) letting $f_2$ be a focal length of the relay optical system, and d be a distance from a rear principal point of the relay optical system to the aperture stop, a condition given by $$0.75 \leq \frac{f_2}{d} \leq 3.0 \tag{1}$$

is satisfied, (1-3) the plurality of light sources are separated at least in a main scanning direction, (1-4) letting $f_1$ be a focal length of the condenser lens, and $f_2$ be the focal length of the relay optical system, a condition given by $$0.2 \leq \frac{f_2}{f_1} \leq 1.0 \tag{2}$$

is satisfied, (1-5) the relay optical system forms images of the plurality of light sources in not more than a one-to-one size, (1-6) letting $\beta_2$ be an imaging magnification of the relay optical system, a condition given by $$0.25 \leq \beta_2 \leq 1.0 \tag{3}$$

is satisfied, (1-7) spherical aberration generated in the relay optical system is canceled by the condenser lens, (1-8) curvature of field generated in the relay optical system is canceled by the condenser lens, (1-9) the relay optical system has a one-unit structure, (1-10) the condenser lens has two, concave and convex lenses sequentially from the light source side, and (1-11) the relay optical system has two convex lenses having the same shape.

According to the present invention, there is also provided (2) a multi-beam light scanning optical system having a light beam incident optical system for causing a condenser lens to condense each of light beams emitted from a plurality of light sources separated at least in a main scanning direction and making the light beams incident on a deflecting surface of an optical deflector, wherein in the light beam incident optical system, a relay optical system is inserted between the plurality of light sources and the condenser lens, an aperture stop for limiting a beam width of each of the light beams emitted from the plurality of light sources is arranged on a light source side with respect to an image forming point of each of the plurality of light sources through the relay optical system, the condenser lens makes the aperture stop substantially conjugate to the deflecting surface of the optical deflector, the relay optical system forms images of the plurality of light sources in not more than a one-to-one size, and letting $f_1$ be a focal length of the condenser lens, $f_2$ be a focal length of the relay optical system, $\beta_2$ be an imaging magnification of the relay optical system, and d be a distance from a rear principal point of the relay optical system to the condenser lens, conditions given by $$0.75 \leq \frac{f_2}{d} \leq 3.0 \tag{1}$$

$$0.2 \leq \frac{f_2}{f_1} \leq 1.0 \tag{2}$$

$$0.25 \leq \beta_2 \leq 1.0 \tag{3}$$

are satisfied.

Especially, in the system, (2-1) spherical aberration generated in the relay optical system is canceled by the condenser lens, (2—2) curvature of field generated in the relay optical system is canceled by the condenser lens, (2-3) the relay optical system has a one-unit structure, (2-4) the condenser lens has two, concave and convex lenses sequentially from the light source side, and (2-5) the relay optical system has two convex lenses having the same shape.

Furthermore, according to the present invention, there is provided (3) a multi-beam light scanning optical system having a light beam incident optical system for causing a condenser lens to condense each of light beams emitted from a plurality of light sources separated at least in a main scanning direction and making the light beams incident on a deflecting surface of an optical deflector, wherein in the light beam incident optical system, a relay optical system is inserted between the plurality of light sources and the condenser lens, an aperture stop for limiting a beam width of each of the light beams emitted from the plurality of light sources is arranged on a light source side with respect to an image forming point of each of the plurality of light sources through the relay optical system, the condenser lens makes the aperture stop substantially conjugate to the deflecting surface of the optical deflector, the relay optical system forms images of the plurality of light sources in not more than a one-to-one size, letting $f_1$ be a focal length of the condenser lens, $f_2$ be a focal length of the relay optical system, $\beta_2$ be an imaging magnification of the relay optical system, and d be a distance from a rear principal point of the relay optical system to the condenser lens, conditions given by $$0.75 \leq \frac{f_2}{d} \leq 3.0 \tag{1}$$

$$0.2 \leq \frac{f_2}{f_1} \leq 1.0 \tag{2}$$

$$0.25 \leq \beta_2 \leq 1.0 \tag{3}$$

are satisfied, and spherical aberration and curvature of field generated in the relay optical system are canceled by the condenser lens.

Especially, in the system, (3-1) the relay optical system has a one-unit structure, (3-2) the condenser lens has two, concave and convex lenses sequentially from the light source side, and (3—3) the relay optical system has two convex lenses having the same shape.

According to the present invention, there is also provided (4) a multi-beam optical scanning apparatus which uses the multi-beam light scanning optical system of the foregoing (1), (1—1) to (1-10), (2), (2-1) to (2-5), (3), and (3-1) to (3—3).

According to the present invention, there is provided (5) an image forming apparatus comprising the multi-beam optical scanning apparatus of the foregoing (4), a photosensitive member arranged on a surface to be scanned, a developer for developing, as a toner image, an electrostatic latent image formed on the photosensitive member by each of the light beams scanned by the multi-beam optical scanning apparatus, a transfer device for transferring the developed toner image onto a transfer member, and a fixing device for fixing the transferred toner image on the transfer member.

There is also provided (6) an image forming apparatus comprising the multi-beam optical scanning apparatus of (4), and a printer controller for converting code data received from an external device into an image signal and outputting the image signal to the multi-beam optical scanning apparatus.

BRIEF DESCRIPTION OF THE DRAWINGS

FIG. 1 is a sectional view showing the main part in the main scanning direction of a multi-beam light scanning optical system according to the first embodiment of the present invention;

FIGS. 2A, 2B, and 2C are views showing a light beam incident optical system in the multi-beam light scanning optical system to explain the effect of the first embodiment of the present invention;

DETAILED DESCRIPTION OF THE PREFERRED EMBODIMENTS

FIG. 1 is a sectional view showing the main part in the main scanning direction of a multi-beam light scanning optical system according to the first embodiment of the present invention, which is applied to an image forming apparatus such as a laser beam printer or digital copying machine.

Figure 11:
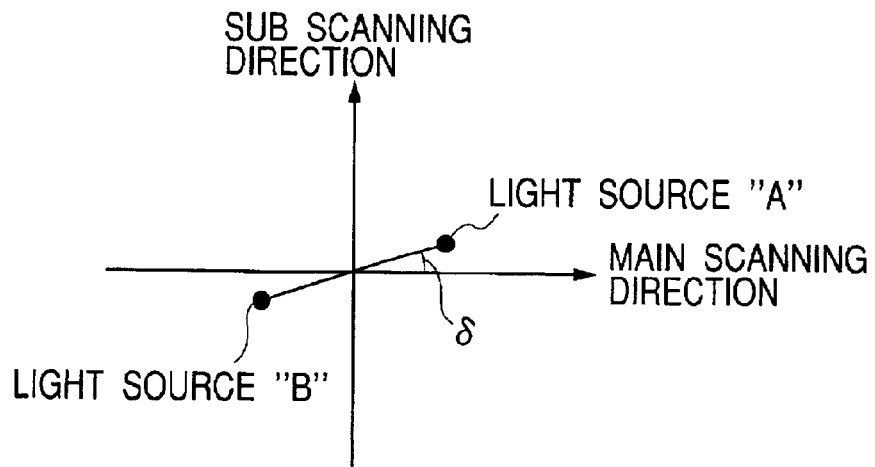
FIG. 11 is a view showing another layout of light emitting points in the conventional multi-beam light scanning optical system.

Referring to FIG. 1, a light source 1 is formed from a semiconductor laser having a plurality of light emitting points, in which a plurality of light sources are obliquely laid out, and a tilt angle δ is adjusted, as shown in FIG. 11, to accurately adjust the sub-scanning line interval on the scanning surface (the surface to be scanned) so as to match the recording density. Although the number of light emitting points is 2 in the first embodiment to help understanding, the above idea can also apply even when the number of light emitting points increases.

Each of light beams emitted from the light emitting points forms an image at a point P through a relay lens 2 serving as a relay optical system 2. Each light beam formed into an image at the point P is converted into a substantially parallel beam, convergent beam, or divergent beam by a condenser lens 3 and converged only in the sub scanning direction by a cylindrical lens 4 so that an image like a focal line long in the main scanning direction is formed near a deflecting/reflecting surface 5a of a polygon mirror 5 serving as an optical deflector. The cylindrical lens 4 comprises a first cylindrical lens made of glass and having convex power and a second cylindrical lens made of a plastic and having concave power. The cylindrical lens 4 corrects the sub-scanning focus movement of an f-θ lens 7 made of a plastic and serving as a scanning optical system due to an environmental variation.

An aperture stop 6 limits the beam width of each light beam converged through the relay lens 2.

The aperture stop 6 is arranged on the light source 1 side with respect to the point P, i.e., the image forming positions of the plurality of light emitting points through the relay lens 2.

The condenser lens 3 is arranged to make the aperture stop 6 and deflecting/reflecting surface 5a almost optically conjugate to each other. The light source 1, relay lens 2, condenser lens 3, cylindrical lens 4, and aperture stop 6 constitute a light beam incident optical system.

Each light beam reflected/deflected and scanned by the polygon mirror 5 that is rotating in a direction indicated by an arrow A in FIG. 1 at a predetermined speed is focused, through the f-θ lens 7 serving as a scanning optical system, into a spot on a scanning surface 8 consisting of a photosensitive drum or the like, and scanned in a direction of an arrow B in FIG. 1 at a predetermined speed.

The light beam incident optical system in the multi-beam light scanning optical system will be described below in detail with reference to FIGS. 2A, 2B, and 2C.

FIG. 2A is a sectional view showing the main scanning section of the light beam incident optical system in the multi-beam light scanning optical system to explain the effect of the first embodiment of the present invention. FIG. 2B is a sectional view showing the sub scanning section. Referring to FIGS. 2A and 2B, the arrangement has no aperture stop 6 in order to explain a case wherein the aperture stop 6 is absent.

As described above, in the light source 1 formed from a semiconductor laser having two light emitting points 1A and 1B, the plurality of light sources are obliquely laid out, and the tilt angle δ is adjusted, as shown in FIG. 11, to accurately adjust the sub-scanning line interval on the scanning target surface so as to match the recording density. The number of light emitting points is set to 2 here. However, the present invention is not limited to this and can be more effectively applied when the number of light emitting points increases to 3 or more. The following description will be made assuming that a semiconductor laser is used as a light source. However, the present invention is not limited to this, and any other light source, e.g., an LED may be used as a light source.

Each of light beams emitted from the two light emitting points 1A and 1B forms an image at the point P through the relay lens 2 serving as a relay optical system. Each light beam formed into an image at the point P is converted into a substantially parallel beam, convergent beam, or divergent beam by the condenser lens 3 and converged only in the sub scanning direction by the cylindrical lens 4 so that an image like a focal line long in the main scanning direction is formed near the deflecting/reflecting surface 5a of the polygon mirror 5 serving as an optical deflector.

Consider principal rays PA and PB of the light beams emitted from the two light emitting points 1A and 1B. When both the two principal rays are emitted parallel to an optical axis AX of the light beam incident optical system, the two principal rays PA and PB cross at a rear focal point Q of the relay optical system.

The condenser lens 3 is arranged to make the rear focal point Q of the relay optical system and deflecting/reflecting surface 5a almost optically conjugate to each other in the main scanning direction. When the condenser lens 3 is arranged in this way, the two principal rays PA and PB that cross at the point Q cross again at a point R on the deflecting/reflecting surface 5a in the main scanning direction through the condenser lens 3.

In the light beam incident optical system with the above arrangement, a main-scanning image forming position shift δY between the two beams due to a focus shift in the main scanning direction as in the prior art described with reference to FIG. 12 can be nullified. As can easily be understood, the image forming position shift δY in the main scanning direction occurs because light beams A and B' shown in FIG. 12 are separated in the main scanning direction.

Figure 12:
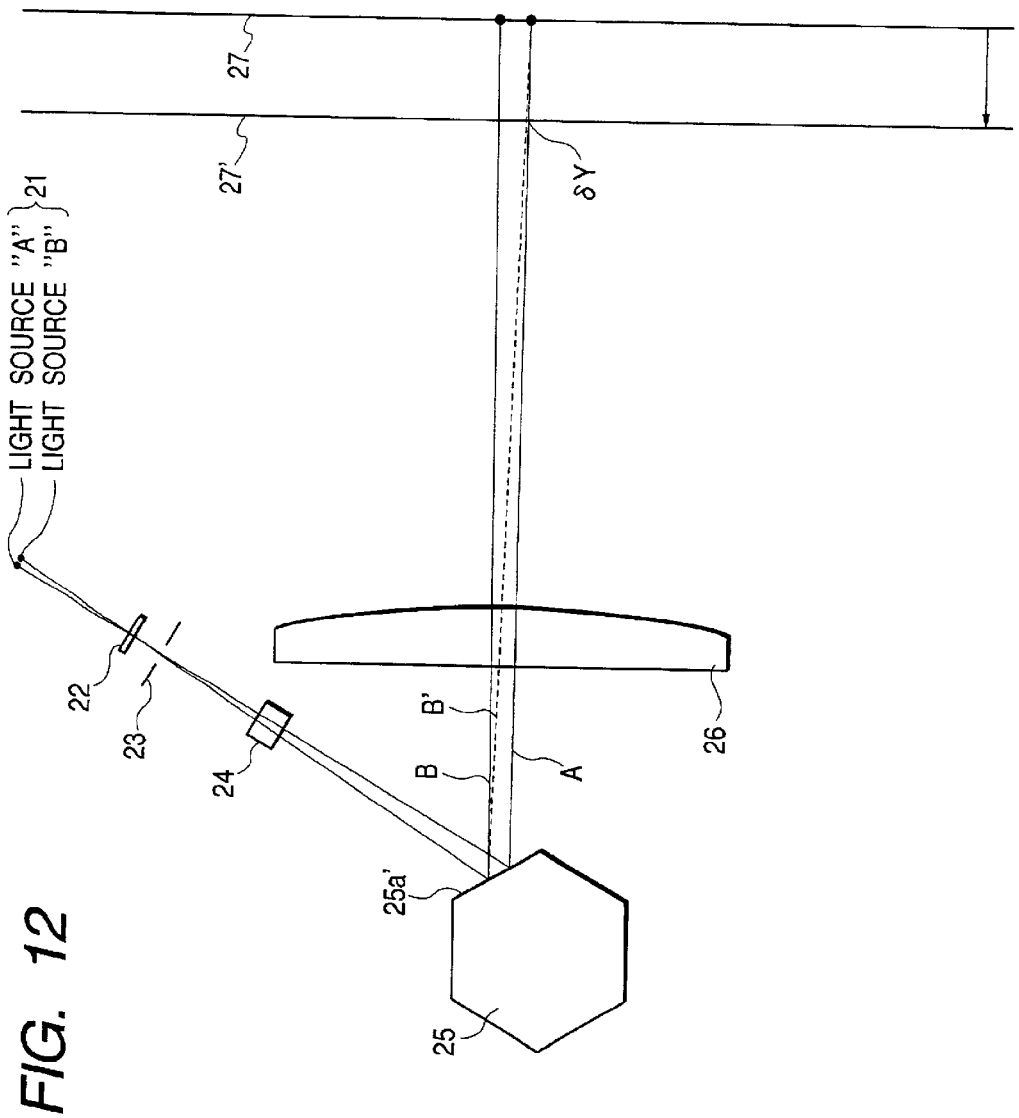
FIG. 12 is an explanatory view of a focus shift in the conventional multi-beam light scanning optical system.

In the first embodiment of the present invention, since the light beam incident optical system is designed such that the two principal rays PA and PB reach the same point R on the deflecting/reflecting surface 5a in the main scanning direction, the light beam PA corresponding to the light beam A in FIG. 12 and a light beam PB' corresponding to the light beam B in FIG. 12 trace the same path. Consequently, the main-scanning image forming position shift δY between the two beams due to the focus shift in the main scanning direction as in the prior art does not occur in principle.

Next, assume a case wherein the principal rays PA and PB of light beams emitted from the two light emitting points 1A and 1B are not parallel to the optical axis AX of the light beam incident optical system. A light beam emitted from the semiconductor laser is ideally parallel to the optical axis AX of the light beam incident optical system but normally has some angular error. As this angular error, an error of ±2° to ±3° must be taken into consideration, though it slightly changes between a direction parallel to the field vibration plane and a direction perpendicular to the field vibration plane.

Assume that only the principal ray PA of the two principal rays PA and PB is not parallel to the optical axis AX of the light beam incident optical system. FIG. 2C is a sectional view showing the main scanning section of the light beam incident optical system in the multi-beam light scanning optical system when only the principal ray PA of the two principal rays PA and PB is not parallel to the optical axis AX of the light beam incident optical system. Referring to FIG. 2C, the principal ray PA that is emitted from the light emitting point 1A while making an angle α in the main scanning direction does not cross the optical axis AX of the light beam incident optical system at the point Q. The principal ray PA passes through a position separated from the optical axis AX at the point Q in the main scanning direction by $\Delta 1 = f_2 \times \tan \alpha$. On the deflecting/reflecting surface 5a, the principal ray PA reaches a point separated in the main scanning direction from the optical axis AX of the light beam incident optical system by $\Delta 2 = \Delta 1 \times \beta_1$, i.e., an amount obtained by multiplying the value $\Delta 1$ by an imaging magnification $\beta_1$ of the condenser lens 3. In this case, since the two principal rays PA and PB do not reach the same point R on the deflecting/reflecting surface 5a, the main-scanning image forming position shift δY occurs between the two beams due to the above-described focus shift in the main scanning direction. As described above, such an angular error cannot be completely eliminated. That is, even when the relay lens 2 and condenser lens 3 are designed as in the first embodiment of the present invention, the image forming position shift δY in the main scanning direction can hardly be nullified.

In the first embodiment, the aperture stop 6 for limiting the beam width of each of light beams emitted from the plurality of light sources is arranged on the light source side with respect to the respective image forming points P by the light beams from the plurality of light sources through the relay optical system.

Figure 3:
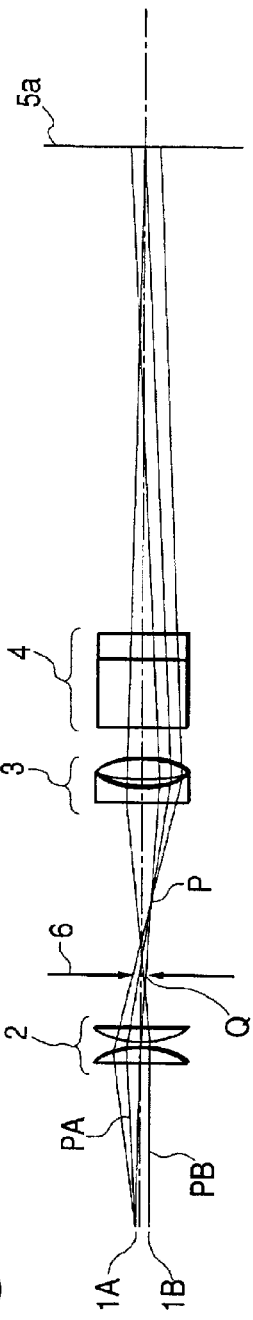
FIG. 3 is a sectional view showing the main scanning section of the multi-beam light scanning optical system according to the first embodiment of the present invention.

FIG. 3 is a sectional view showing the main scanning section of the light beam incident optical system according to the first embodiment of the present invention in which the aperture stop 6 is arranged at the point Q on the optical axis AX of the light beam incident optical system. FIG. 3 shows a case wherein only the principal ray PA of the two principal rays PA and PB is not parallel to the optical axis AX of the light beam incident optical system, as in FIG. 2C.

Referring to FIG. 3, the beam width of the principal ray PA that is emitted from the light emitting point 1A while making the angle a in the main scanning direction is limited by the aperture stop 6 so that the principal ray PA crosses the optical axis AX of the light beam incident optical system at the point Q, like the principal ray PB emitted from the light emitting point 1B. Hence, the two principal rays PA and PB that cross at the point Q cross again at the point R on the deflecting/reflecting surface 5a through the condenser lens 3.

That is, in the first embodiment of the present invention, the aperture stop 6 for limiting the beam width of each of light beams emitted from the plurality of light sources is arranged at the point Q which is the light source side with respect to the image forming points P of the plurality of light sources through the relay lens 2 serving as a relay optical system. With this arrangement, even when the principal rays PA and PB of the light beams emitted from the two light emitting points 1A and 1B are not parallel to the optical axis AX of the light beam incident optical system, the two principal rays cross again at the point R on the deflecting/reflecting surface 5a through the condenser lens 3. Hence, the main-scanning image forming position shift δY between the two beams due to the above-described focus shift in the main scanning direction can be nullified.

With this arrangement, even when light beams emitted from the light sources have an angle difference, any decrease in printing accuracy and any degradation in image quality can be effectively prevented by always nullifying the main-scanning image forming position shift δY. Additionally, even when an inexpensive plastic lens is used as an f-θ lens serving as a scanning optical system, the main-scanning image forming position shift δY due to the focus shift by the f-θ lens can be eliminated. For this reason, a multi-beam light scanning optical system which can output a high-quality image free from any decrease in printing accuracy and any degradation in image quality with an inexpensive arrangement, and an image forming apparatus can be attained.

When a light beam incident optical system is formed using the relay lens 2 serving as a relay optical system, the condenser lens 3, and the aperture stop 6, as in the first embodiment of the present invention, the system tends to be bulky as compared to the conventional incident optical system. To prevent any increase in size, in the first embodiment of the present invention, a focal length $f_2$ of the relay lens 2 serving as a relay optical system, an imaging magnification $\beta_2$ of the relay lens 2, a focal length $f_1$ of the condenser lens 3, a distance d from the rear principal point of the relay optical system to the aperture stop 6, and the like are set to an appropriate relationship, thereby effectively obtaining a compact arrangement.

Figure 4:
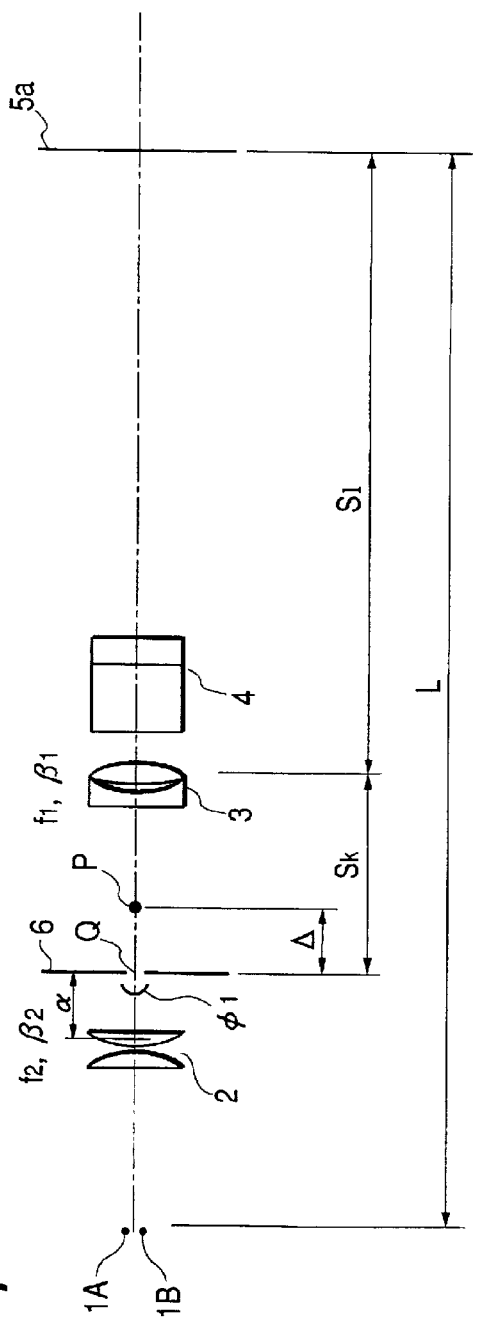
FIG. 4 is a view for explaining the arrangement of the main scanning section of the multi-beam light scanning optical system according to the first embodiment of the present invention.

This will be described below with reference to FIG. 4. FIG. 4 is a sectional view showing the main scanning section of the light beam incident optical system according to the first embodiment of the present invention in which the aperture stop 6 is arranged at the point Q on the optical axis AX of the light beam incident optical system, as in FIG. 3. The plurality of light sources formed from a semiconductor laser have the light emitting points 1A and 1B, respectively. Let $f_2$ be the focal length of the relay lens 2, $\beta_2$ be the imaging magnification of the relay lens 2, $f_1$ be the focal length of the condenser lens 3, d be the distance from the rear principal point of the relay lens 2 serving as a relay optical system to the aperture stop 6, $S_1$ be the distance from the rear principal point of the condenser lens 3 to the deflecting/reflecting surface 5a, $S_k$ be the distance from the aperture stop 6 to the front principal point of the condenser lens 3, $\Delta$ be the distance from the aperture stop 6 to the image forming point P of the plurality of light sources through the relay lens 2, $\phi_1$ be the stop diameter of the aperture stop 6, $\phi_0$ be the beam system of each light beam emerging from the condenser lens 3, Fn1 be the image-side F-number of each light beam through the relay lens 2, which is determined by the aperture stop 6, and L be the distance from the light emitting points 1A and 1B of the plurality of light sources to the deflecting/reflecting surface 5a. Assume that each light beam emerging from the condenser lens 3 is a substantially parallel beam.

In this case, the distance L from the light emitting points 1A and 1B of the plurality of light sources to the deflecting/reflecting surface 5a is given by $$L = \left(2 + \beta_2 + \frac{1}{\beta_2}\right) \times f_2 + f_1$$

To reduce the value L, i.e., to make the incident optical system compact, the values $f_2$ and $f_1$ are decreased, and the value $\beta_2$ is set at 1. At this time, the distance L can be minimized, as can be seen. The contribution ratio of the focal length $f_2$ of the relay lens and the focal length $f_1$ of the condenser lens to the distance L is $f_2:f_1=4:1$, as is apparent from the above equation. That is, when $$f_2/f_1 = 1/4$$

or less, and $\beta_2=1$, the value L can be effectively decreased.

However, if the value $f_2$ is set too small relative to the value $f_1$, spherical aberration and curvature of field generated by the relay lens 2 serving as a relay optical system become large. To satisfactorily correct the aberrations, the value $f_2$ is set large relative to the value $f_1$. However, if the value $f_2$ is set too large, the value L cannot be set small, and therefore, the incident optical system cannot be made compact. In the first embodiment of the present invention, the values $f_1$ and $f_2$ are set to satisfy $$0.2 \leq \frac{f_2}{f_1} \leq 1.0 \tag{2}$$

The stop diameter $\phi_1$ of the aperture stop 6 is given by $$\phi_1 \leq \frac{\Delta}{Fn1}$$

As is apparent from this relation, the stop diameter $\phi_1$ of the aperture stop 6 is determined by the values $\Delta$ and Fn1. The value $\Delta$ is determined by the values $S_1$, $S_k$, and $f_1$. When the condenser lens is arranged at a normal position, the value $\Delta$ is normally relatively small. At this time, if the value Fn1 is large, the stop diameter $\phi_1$ of the aperture stop 6 becomes small. For example, when the stop diameter $\phi_1$ of the aperture stop 6 has an inner diameter tolerance, the variation in spot diameter on the scanning surface becomes large due to the inner diameter tolerance, and it is difficult to obtain a stable spot diameter. To reduce the influence of the inner diameter tolerance, the value Fn1 is preferably set small. This can be achieved by causing the relay lens 2 serving as a relay optical system to form the images of the plurality of light sources in a one-to-one size or less. However, if the imaging magnification is excessively reduced, the coupling efficiency of light beams from the light sources through the relay lens 2 undesirably degrades. Hence, in the first embodiment of the present invention, the imaging magnification $\beta_2$ of the relay lens 2 is set to satisfy $$0.25 \leq \beta_2 \leq 1.0 \tag{3}$$

The aperture stop 6 is ideally preferably arranged at the rear focal position of the relay lens 2 serving as a relay optical system. However, such layout may be impossible in some cases because of the overall arrangement of the incident optical system and a mechanical limitation on the layout. In such a case, the position of the aperture stop 6 may be appropriately changed within the allowable range of the amount of the main-scanning image forming position shift $\delta Y$ between the beams. Hence, in the first embodiment of the present invention, letting $f_2$ be the focal length of the relay optical system and d be the distance from the rear principal point of the relay optical system to the aperture stop, the following condition is satisfied:

$$0.75 \leq \frac{f_2}{d} \leq 3.0 \tag{1}$$

If the aperture stop 6 is disposed such that the value "$f_2/d$" is below the lower limit of condition (1), the aperture stop 6 is too close to the condenser lens 3, and the stop diameter $\phi_1$ must be set small. As described above, if the stop diameter $\phi_1$ of the aperture stop 6 has an inner diameter tolerance, the variation in spot diameter on the scanning surface becomes large, and it is hard to obtain a stable spot diameter. Conversely, if the aperture stop 6 is disposed such that the value "$f_2/d$" exceeds the upper limit of condition (1), the amount of the main-scanning image forming position shift $\delta Y$ between the beams falls outside the allowable range, the imaging performance degrades because of an asymmetrical light intensity distribution in each light beam, and the light amount difference on the scanning surface between the light beams becomes large.

As a characteristic feature of the first embodiment of the present invention, to make a compact incident optical system, the relay optical system has a one-unit structure, and spherical aberration and curvature of field generated by the relay optical system are canceled by the condenser lens 3.

As described with relations (2) and (3), the focal length $f_2$ of the relay lens serving as a relay optical system need be small to some degree, and the imaging magnification of the relay lens 2 is also preferably set on the reduction side. Furthermore, preferably, each of the relay lens 2 and condenser lens 3 has a small number of components and is designed to be compact. However, it is particularly difficult to correct spherical aberration and curvature of field generated in the relay lens 2, and it is therefore substantially impossible to design the relay lens 2 as a two-lens structure with a small number of components.

In the first embodiment of the present invention, the relay lens 2 is formed from two lenses having the same shape, and spherical aberration and curvature of field generated in the relay lens are canceled by the condenser lens 3.

Both the spherical aberration and curvature of field generated by the relay lens 2 are small. These small spherical aberration and curvature of field are canceled by forming the condenser lens 3 with an optimum lens structure. More specifically, the condenser lens 3 has two lenses, i.e., concave and convex lenses sequentially from the light source side. With this lens structure, the condenser lens 3 generates large spherical aberration and curvature of field to cancel the small spherical aberration and curvature of field of the relay lens 2.

In the first embodiment of the present invention, this arrangement makes it possible to form the relay lens 2 and condenser lens 3 with small numbers of components to make the incident optical system compact, and also to satisfactorily correct spherical aberration and curvature of field in the entire incident system. Hence, the spot shape on the scanning surface can also be satisfactorily corrected, and the relative difference in spot image forming performance between the light beams corresponding to the plurality of light sources can be corrected sufficiently small. As a result, a multi-beam light scanning optical system which can output a high-quality image free from any decrease in printing accuracy and any degradation in image quality with an inexpensive and compact arrangement, and an image forming apparatus can be attained.

Figure 9:
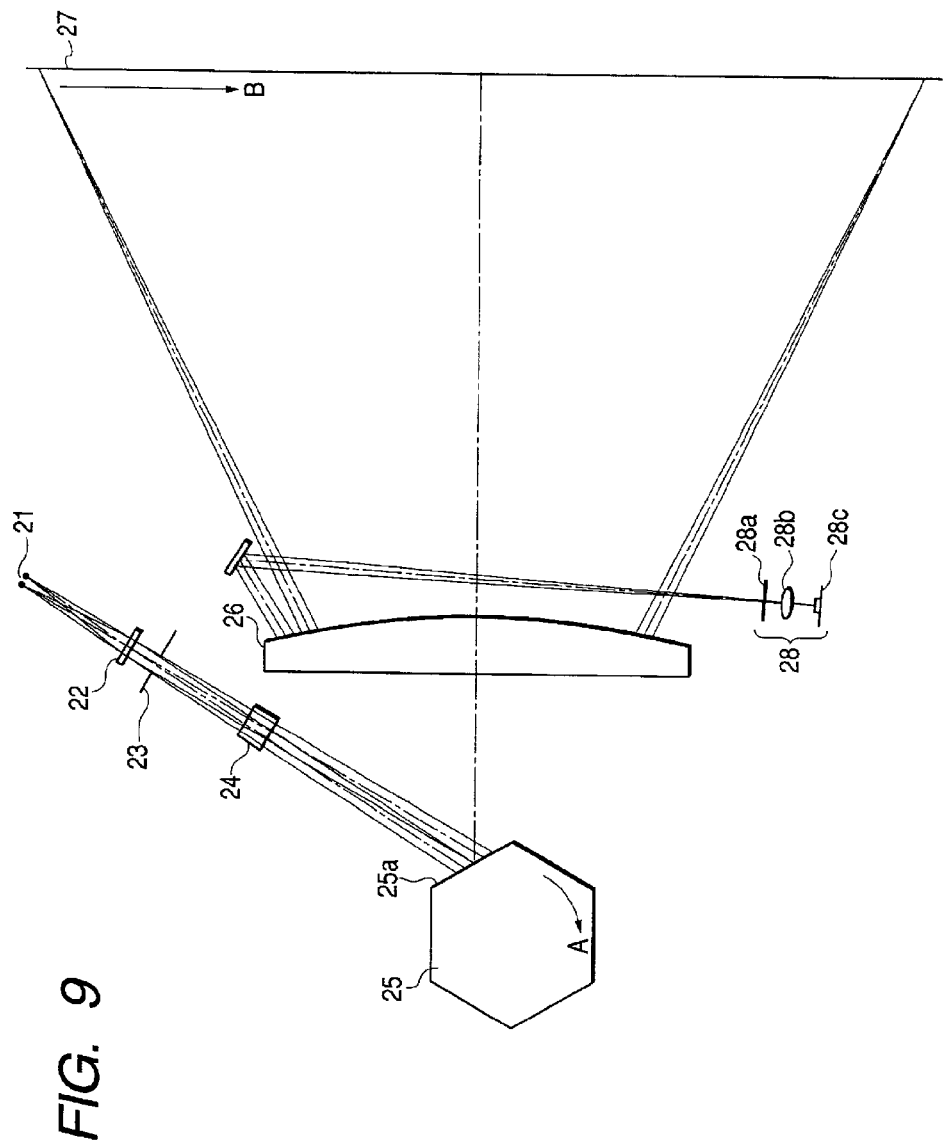
FIG. 9 is a view for explaining a conventional multi-beam light scanning optical system.
Figure 10:
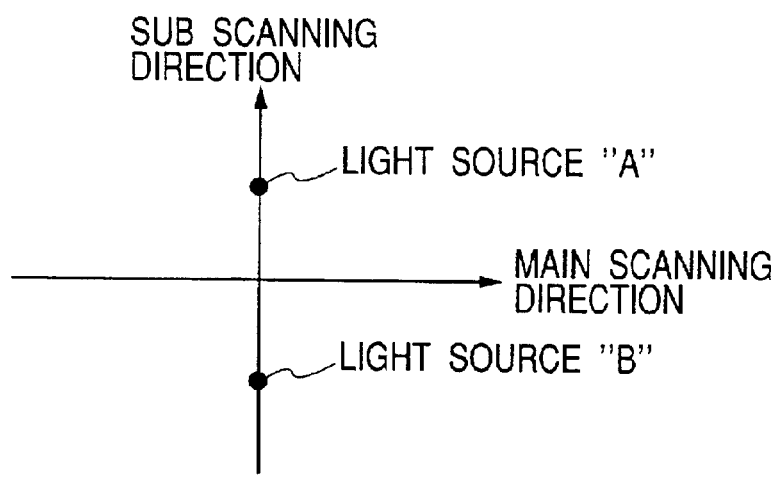
FIG. 10 is a view showing a layout of light emitting points in the conventional multi-beam light scanning optical system.

A case wherein the plurality of light sources are laid out as shown in FIG. 11 has been described above. When the combined focal length of the relay lens 2 and condenser lens 3 is set to be longer than the focal length of the collimator lens 22 in the conventional structure shown in FIG. 9, the sub-scanning interval between lines scanned by the light beams on the scanning surface can be reduced even when the plurality of light sources are laid out as shown in FIG. 10. That is, since each of the light beams emitted from the plurality of light sources can be used in the sub scanning section within a portion close to the optical axis of each optical system of the light scanning optical system, the relative difference in image forming performance between the light beams corresponding to the plurality of light sources can be decreased, and a high-quality image can be output.

Table 1 shows the characteristics of the multi-beam light scanning optical system according to the first embodiment of the present invention.

When the intersection between each lens surface and the optical axis is defined as the origin, the direction of the optical axis is defined as the X-axis, an axis perpendicular to the optical axis in the main scanning section is defined as the Y-axis, and an axis perpendicular to the optical axis in the sub scanning section is defined as the Z-axis, the aspherical shape of the main scanning section of the f-$\theta$ lens serving as a scanning lens is given by $$x = \frac{y^2/R}{1+(1-(1+k)(y/R)^2)^{1/2}} + B_4 y^4 + B_6 y^6 + B_8 y^8 + B_{10} y^{10}$$

where R is the radius of curvature and k and $B_4$ to $B_{10}$ are aspherical coefficients.

If each coefficient changes depending on whether the value y is positive or negative, coefficients with a suffix u, i.e., ku and $B_{4u}$ to $B_{10u}$ are used when the value y is positive, and coefficients with a suffix 1, i.e., k1 and $B_{41}$ to $B_{101}$, are used when the value y is negative.

As for the shape of the sub scanning section, letting y be the lens surface coordinate in the main scanning direction, a radius r' of curvature is given by $$r' = r(1 + D_2 y^2 + D_4 y^4 + D_6 y^6 + D_8 y^8 + D_{10} y^{10})$$

where r is the radius of curvature and $D_2$ to $D_{10}$ are coefficients.

If each coefficient changes depending on whether the value y is positive or negative, the radius r' of curvature is calculated using coefficients with a suffix u, i.e., $D_{2u}$ to $D_{10u}$ when the value y is positive, and the radius r' of curvature is calculated using coefficients with a suffix 1, i.e., $D_{21}$ to $D_{101}$ when the value y is negative.

Table 2 shows the values $f_1$, $f_2$, $\beta_2$, and d and characteristic values corresponding to conditions (1) to (3). As is apparent from this table, all these values satisfy the above conditions.

TABLE 1

| Wavelength used | $\lambda$ (nm) | 780 |
|---|---|---|
| Number of light emitting points | n | 2 |
| Interval between light emitting points | 1 | 0.0900 |
| Tilt angle of layout of light sources | $\delta$ | 2.9727 |
| Light source to first surface of relay lens | d0 | 17.5665 |
| Radius of curvature of first surface of first relay lens | R1 | −1678.5394 |
| Thickness of first relay lens | d1 | 1.6249 |
| Radius of curvature of second surface of first relay lens | R2 | −10.2985 |
| Second surface of first relay lens to first surface of second relay lens | d2 | 0.8126 |
| Radius of curvature of first surface of second relay lens | R3 | 10.2985 |
| Thickness of second relay lens | d3 | 1.6249 |
| Radius of curvature of second surface of second relay lens | R4 | 1678.8334 |
| Second surface of second relay lens to aperture stop | d4 | 5.6744 |
| Aperture stop to light source image forming point | d5 | 4.1070 |
| Light source image forming point to first surface of first condenser lens | d6 | 14.1901 |
| Radius of curvature of first surface of first condenser lens | R7 | 98.5509 |
| Thickness of first condenser lens | d7 | 2.0000 |
| Radius of curvature of second surface of first condenser lens | R8 | 16.1422 |
| Second surface of first condenser lens to first surface of second condenser lens | d8 | 1.0000 |
| Radius of curvature of first surface of second condenser lens | R9 | 79.9074 |
| Thickness of second condenser lens | d9 | 2.0000 |
| Radius of curvature of second surface of second condenser lens | R10 | −10.9761 |
| Second condenser lens to first surface of first cylindrical lens | d10 | 3.0130 |
| Sub-scanning radius of curvature of first surface of first cylindrical lens | Rs11 | 28.6850 |
| Thickness of first cylindrical lens | d11 | 7.0000 |
| Sub-scanning radius of curvature of second surface of first cylindrical lens | Rs12 | 0.0000 |
| Second surface of first cylindrical lens to first surface of second cylindrical lens | d12 | 0.3110 |
| Sub-scanning radius of curvature of first surface of second cylindrical lens | Rs13 | −53.3330 |
| Thickness of second cylindrical lens | d13 | 3.0000 |
| Sub-scanning radius of curvature of second surface of second cylindrical lens | Rs14 | 0.0000 |
| Second surface of second cylindrical lens to polygon deflecting/reflecting surface | d14 | 83.3600 |
| Polygon deflecting/reflecting surface to first | d15 | 41.7767 |

TABLE 1-continued

| | | |
|---|---|---|
| surface of first f-θ lens | | |
| Thickness of first f-θ lens | d16 | 9.5000 |
| Second surface of first f-θ lens to first surface of second f-θ lens | d17 | 7.1362 |
| Thickness of second f-θ lens | d18 | 8.6000 |
| Second surface of second f-θ lens to scanning target surface | d19 | 189.7396 |
| Refractive index of first relay lens | n1 | 1.7620 |
| Refractive index of second relay lens | n2 | 1.7620 |
| Refractive index of first condenser lens | n3 | 1.5107 |
| Refractive index of second condenser lens | n4 | 1.7620 |
| Refractive index of first cylindrical lens | n5 | 1.5107 |
| Refractive index of second cylindrical lens | n6 | 1.4910 |
| Refractive index of first f-θ lens | n7 | 1.5242 |
| Refractive index of second f-θ lens | n8 | 1.5242 |
| Polygon incident angle of incident optical system | α | 60.0000 |
| Polygon maximum exit angle | $\theta_{max}$ | 41.3468 |
| Polygon circumscribed circle diameter φ50 hexahedron | | |

F-θ lens shape

| | First surface | | Second surface |
|---|---|---|---|
| First f-θ lens | | | |
| R | −67.970 | R | −49.663 |
| k | −5.593E − 01 | ku | 3.780E − 02 |
| $B_4$ | 1.106E − 06 | $B_{4u}$ | 1.207E − 06 |
| $B_6$ | 5.551 − 11 | $B_{6u}$ | 8.041E − 10 |
| $B_8$ | 0.000E + 00 | $B_{8u}$ | −3.000E − 13 |
| $B_{10}$ | 0.000E + 00 | $B_{10u}$ | 1.631E − 16 |
| | | kl | 2.867E − 02 |
| | | $B_{4l}$ | 1.156E − 06 |
| | | $B_{6l}$ | 8.466E − 10 |
| | | $B_{8l}$ | −3.165E − 13 |
| | | $B_{10l}$ | 1.631E − 16 |
| r | −29.500 | r | −22.884 |
| $D_2$ | 0.000E + 00 | $D_{2u}$ | −2.057E − 04 |
| $D_4$ | 0.000E + 00 | $D_{4u}$ | 6.197E − 08 |
| $D_6$ | 0.000E + 00 | $D_{6u}$ | 0.000E + 00 |
| $D_8$ | 0.000E + 00 | $D_{8u}$ | 0.000E + 00 |
| $D_{10}$ | 0.000E + 00 | $D_{10u}$ | 0.000E + 00 |
| | | $D_{2l}$ | −1.810E − 04 |
| | | $D_{4l}$ | 5.556E − 08 |
| | | $D_{6l}$ | 0.000E + 00 |
| | | $D_{8l}$ | 0.000E + 00 |
| | | $D_{10l}$ | 0.000E + 00 |
| Second f-θ lens | | | |
| R | 46.718 | R | 45.398 |
| k | −9.145E + 00 | k | −9.476E + 00 |
| $B_4$ | −5.632E − 07 | $B_4$ | −1.035E − 06 |
| $B_6$ | −8.574E − 11 | $B_6$ | 9.461E − 11 |
| $B_8$ | 3.524E − 14 | $B_8$ | −1.308E − 14 |
| $B_{10}$ | −2.323E − 18 | $B_{10}$ | 1.959E − 18 |
| r | −68.000 | r | −25.559 |
| $D_2$ | 1.874E − 03 | $D_2$ | 9.964E − 04 |
| $D_4$ | 1.909E − 06 | $D_4$ | −4.929E − 07 |
| $D_6$ | 0.000E + 00 | $D_6$ | 1.260E − 10 |
| $D_8$ | 0.000E + 00 | $D_8$ | −1.582E − 14 |
| $D_{10}$ | 0.000E + 00 | $D_{10}$ | 7.640E − 19 |

TABLE 2

| | |
|---|---|
| $f_1$ | 18.00008 |
| $f_2$ | 7.025032 |
| $\beta_2$ | 0.58824 |
| d | 7.014606 |
| $f_2/d$ | 1.001468 |
| $f_2/f_1$ | 0.58824 |
| $\beta_2$ | 0.58824 |

TABLE 3

| | |
|---|---|
| $f_1$ | 18.00008 |
| $f_2$ | 7.025032 |
| $\beta_2$ | 0.58824 |
| d | 2.844606 |
| $f_2/d$ | 2.469597 |
| $f_2/f_1$ | 0.58824 |
| $\beta_2$ | 0.58824 |

Figure 5:
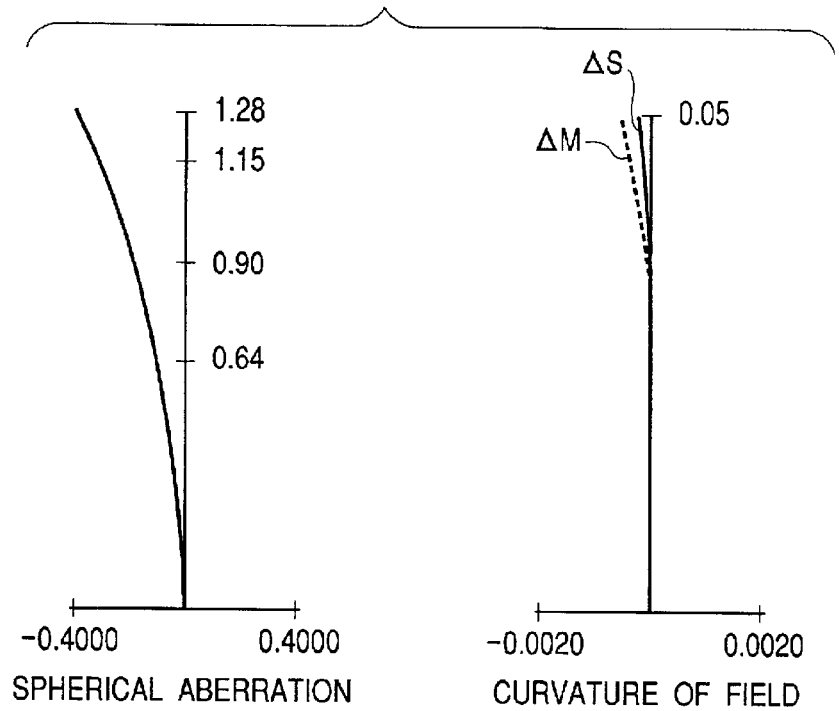
FIG. 5 shows views of spherical aberration and curvature of field generated in the relay lens 2.
Figure 6:
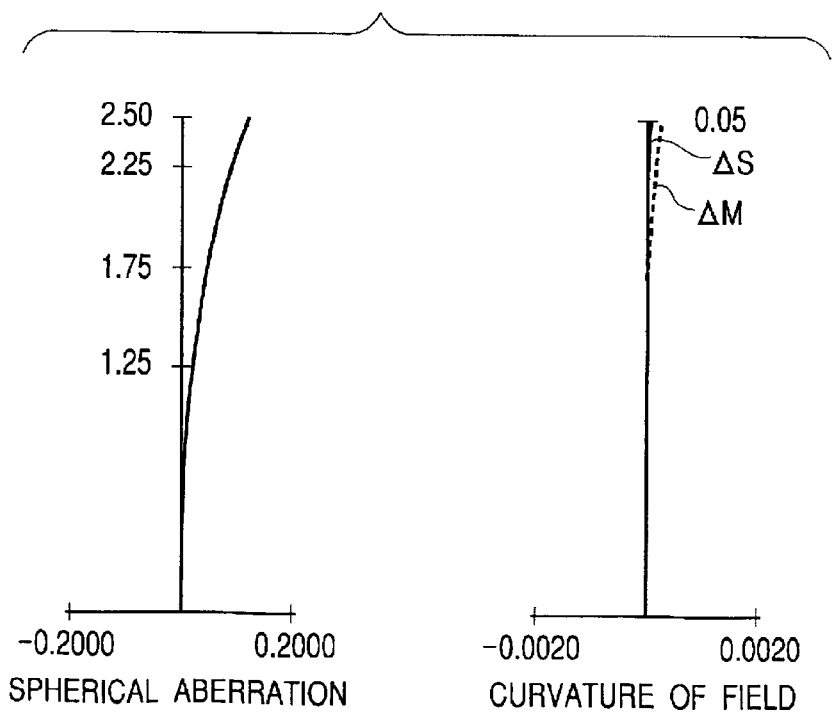
FIG. 6 shows views of spherical aberration and curvature of field generated in the condenser lens 3.
Figure 7:
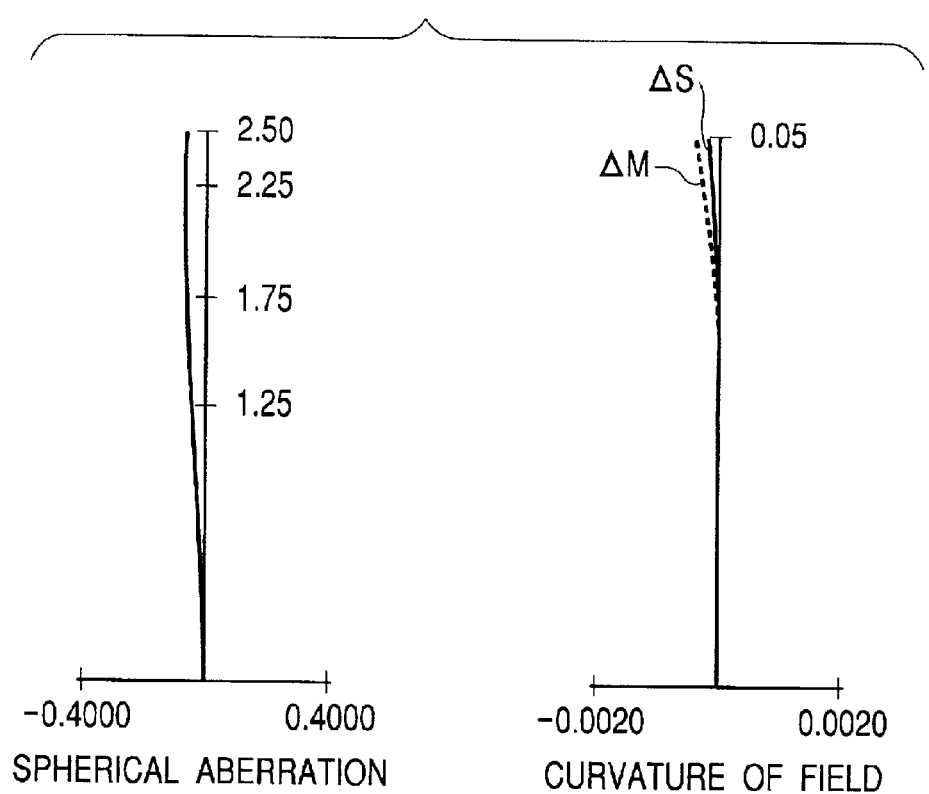
FIG. 7 shows views of spherical aberration and curvature of field in the entire incident optical system by the relay lens 2 and condenser lens 3.

FIG. 5 shows spherical aberration and curvature of field generated in the relay lens 2 serving as a relay optical system. FIG. 6 shows spherical aberration and curvature of field generated in the condenser lens 3. FIG. 7 shows spherical aberration and curvature of field in the entire incident optical system by the relay lens 2 and condenser lens 3. Each aberration chart is calculated in a state wherein a light beam is made incident from the deflecting/reflecting surface 5a side. As is apparent from FIGS. 5 to 7, the spherical aberration and curvature of field generated in the relay lens 2 are canceled by the spherical aberration and curvature of field generated in the condenser lens 3. Here ΔM is curvature of field in the main scanning section, and ΔS is curvature of field in the sub scanning section.

Figure 8:
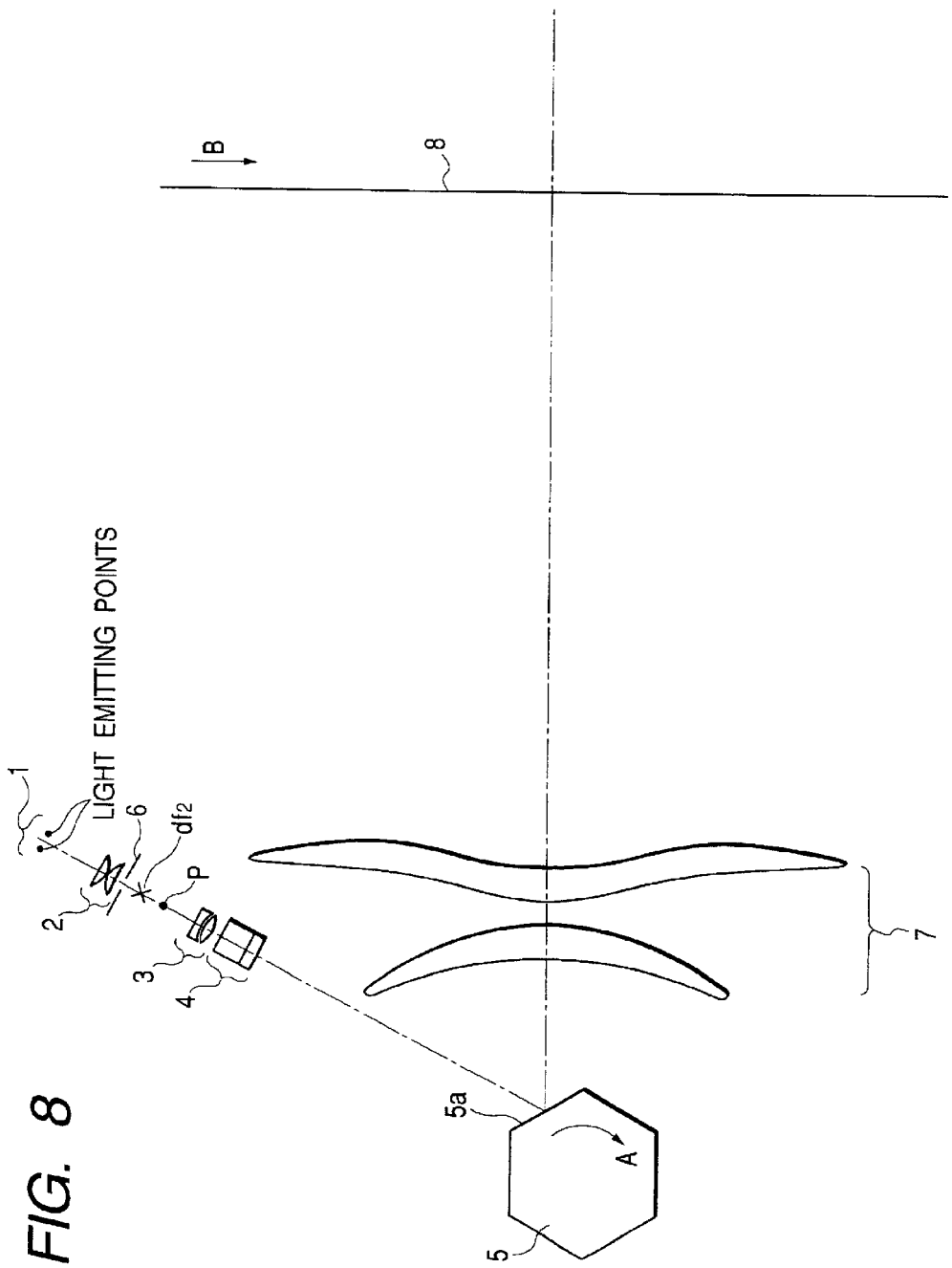
FIG. 8 is a sectional view showing the main part in the main scanning direction of a multi-beam light scanning optical system according to the second embodiment of the present invention.

The second embodiment of the present invention will be described next. FIG. 8 is a sectional view showing the main part in the main scanning direction of a multi-beam light scanning optical system according to the second embodiment of the present invention, which is applied to an image forming apparatus such as a laser beam printer or digital copying machine.

In the second embodiment, an aperture stop 6 is arranged on the light source side with respect to a rear focal position $df_2$ of a relay lens 2 serving as a relay optical system. The remaining characteristic values are the same as in the first embodiment. Table 3 shows values $f_1$, $f_2$, $\beta_2$, and d and characteristic values corresponding to conditions (1) to (3) in the second embodiment.

In the second embodiment, since the aperture stop 6 is arranged on the light source side with respect to the rear focal position $df_2$ of the relay lens 2 serving as a relay optical system, a stop diameter $\phi_1$ of the aperture stop 6 can be set larger than in the first embodiment so that the influence of the inner diameter tolerance of the stop diameter $\phi_1$ on the spot diameter on the scanning surface is relaxed. With this arrangement, the allowable degree of the inner diameter tolerance of the aperture stop can be increased to 2.02 times as compared to the first embodiment, and the component accuracy can be relaxed.

On the other hand, since the aperture stop 6 is shifted from the rear focal position of the relay lens 2 serving as a relay optical system, a main-scanning image forming position shift δY between two beams due to a focus shift in the main scanning direction is not eliminated.

In the second embodiment, a separation amount Δ2 on a deflecting/reflecting surface 5a between principal rays PA and PB of light beams emitted from light emitting points is 0.166 mm. The focal length of the f-θ lens serving as a scanning lens is 212 mm. For example, when a focus shift of 1 mm is generated in the main scanning direction, the main-scanning image forming position shift δY between two beams is given by $$\delta Y = \frac{\Delta_2}{f_{f\theta}} = 0.783 \ \mu m$$

In a normal scanning optical system, if the focus shift in the main scanning direction exceeds 2 mm, the spot diameter in the main scanning direction increases. To prevent it, normally assembly adjustment is done such that the focus shift in the main scanning direction becomes 2 mm or less.

When the focus shift in the main scanning direction is 2 mm, the main-scanning image forming position shift δY between two beams is 1.6 μm, i.e., twice the value calculated by the above equation. According to experiments by the present inventor, it was confirmed that when the image forming position shift in the main scanning direction exceeds 7 μm, it is noticeable as an image. In the second embodiment, however, the main-scanning image forming position shift between two beams is 1.6 μm, i.e., sufficiently falls within the allowable range.

In the second embodiment, the allowable degree of the aperture stop 6 is set to 2.02 times as compared to that of an aperture stop arranged at the rear focal position of the relay lens 2 serving as a relay optical system. This makes it possible to relax the component accuracy and to sufficiently set the main-scanning image forming position shift between beams within the allowable range.

Figure 13:
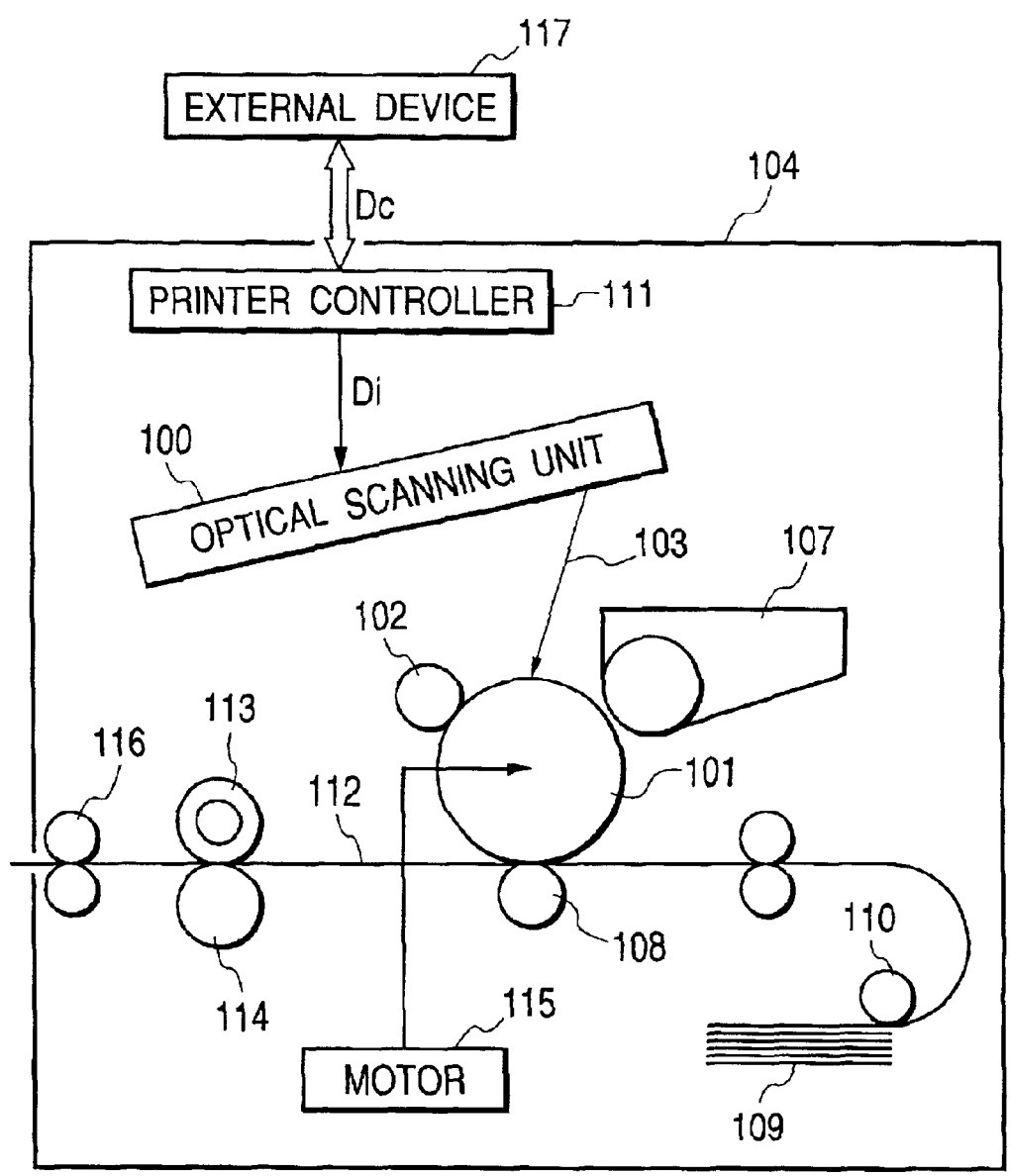
FIG. 13 is a sectional view showing the main part in the sub scanning direction of an image forming apparatus according to an embodiment of the present invention.

FIG. 13 is a sectional view showing the main part in the sub scanning direction of an image forming apparatus according to an embodiment of the present invention. Referring to FIG. 13, an image forming apparatus 104 of the present invention receives code data Dc from an external device 117 such as a personal computer. The code data Dc is converted into image data (dot data) Di by a printer controller 111 in the apparatus. The image data Di is input to a multi-beam optical scanning unit 100 using the multi-beam light scanning optical system having the arrangement of the first or second embodiment. A plurality of light beams 103 modulated in accordance with the image data Di are emitted from the multi-beam optical scanning unit 100. The photosensitive surface of a photosensitive drum 101 is scanned in the main scanning direction by the plurality of light beams 103.

The photosensitive drum 101 serving as an electrostatic latent image carrier (photosensitive member) is rotated clockwise or counterclockwise by a motor 115. In accordance with this rotation, the photosensitive surface of the photosensitive drum 101 moves relative to the light beams 103 in the sub scanning direction perpendicular to the main scanning direction. A charging roller 102 for uniformly charging the surface of the photosensitive drum 101 is arranged on the upper side of the photosensitive drum 101 and abuts against its surface. The surface of the photosensitive drum 101, which is charged by the charging roller 102, is irradiated with the light beams 103 scanned by the multi-beam optical scanning unit 100.

As described above, the plurality of light beams 103 are modulated on the basis of the image data Di. When the photosensitive drum surface is irradiated with the light beams 103, an electrostatic latent image is formed on the surface of the photosensitive drum 101. This electrostatic latent image is developed as a toner image by a developer 107 which abuts against the photosensitive drum 101 on the downstream side of the irradiation position of the plurality of light beams 103 along the rotation direction of the photosensitive drum 101.

The toner image developed by the developer 107 is transferred onto a paper sheet 112 as a transfer member by a rotary roller 108 arranged on the lower side of the photosensitive drum 101 to oppose the photosensitive drum 101. The paper sheet 112 is stored in a paper cassette 109 in front (right side in FIG. 13) of the photosensitive drum 101. Manual feed is also possible. A feed roller 110 is arranged at an end portion of the paper cassette 109 to feed the paper sheet 112 in the paper cassette 109 to a convey path.

The paper sheet 112 having an unfixed toner image transferred thereon in the above way is conveyed to a fixer on the rear side (left side in FIG. 13) of the photosensitive drum 101. The fixer comprises a fixing roller 113 having a fixing heater (not shown) inside and a press roller 114 pressed against the fixing roller 113. The unfixed toner image on the paper sheet 112 is fixed by pressing the paper sheet 112 conveyed from the transfer section by the press portion between the fixing roller 113 and the press roller 114 and heating the paper sheet 112. Discharge rollers 116 are arranged on the rear side of the fixing roller 113 to discharge the fixed paper sheet 112 from the image forming apparatus.

Although not illustrated in FIG. 13, the printer controller 111 executes not only data conversion described above but also control for the sections in the image forming apparatus, including the motor 115, and a polygon motor and the like in the multi-beam optical scanning apparatus.

As has been described above, in the multi-beam light scanning optical system according to the present invention, the incident optical system is formed using the optimum arrangement of the relay optical system and condenser lens. Hence, a multi-beam light scanning optical system which can optimally achieve high-speed operation and high image quality by effectively preventing any image forming position shift between light beams from a plurality of light sources without any complex adjustment, and an image forming apparatus using the multi-beam light scanning optical system can be provided.

What is claimed is:

1. A multi-beam light scanning optical system having an optical deflector and, a light beam incident optical system for causing a condenser lens to condense each of light beams emitted from a plurality of light sources and making the light beams incident on a deflecting surface of said optical deflector, wherein in said light beam incident optical system, a relay optical system is inserted between the plurality of light sources and the condenser lens, wherein an image forming point of each of said plurality of light sources through said relay optical system in the main scanning plane is located between said optical deflector and said relay optical system, wherein an aperture stop for limiting a beam width of each of the light beams emitted from the plurality of light sources is arranged on a light source side with respect to said image forming point, and wherein letting $f_2$ be a focal length of said optical system in the main scanning plane, and d be a distance from a rear principal point of said relay optical system to said aperture stop in the main scanning plane, a condition given by $$0.75 \leq \frac{f_2}{d} \leq 3.0$$

is satisfied.

2. A system according to claim 1, wherein the condenser lens is so disposed as to make said aperture stop substantially conjugate to the deflecting surface of the optical deflector.

3. A system according to claim 1, wherein the plurality of light sources are so arranged to be separated at least in a main scanning direction.

4. A system according to claim 3, wherein said relay optical system forms images of the plurality of light sources in not more than a one-to-one size.

5. A system according to claim 4, wherein letting $\beta_2$ be an imaging magnification of said relay optical system in the main scanning plane, a condition given by $$0.25 \leq \beta_2 \leq 1.0$$

is satisfied.

6. A system according to claim 5, wherein spherical aberration generated in said relay optical system is canceled by the condenser lens.

7. A system according to claim 6, wherein said relay optical system has a one-unit structure.

8. A system according to claim 7, wherein the condenser lens has two, concave and convex lenses sequentially from the light source side.

9. A system according to claim 8, wherein said relay optical system has two convex lenses having the same shape.

10. A system according to claim 5, wherein curvature of field generated in said relay optical system is canceled by the condenser lens.

11. A system according to claim 10, wherein said relay optical system has a one-unit structure.

12. A system according to claim 11, wherein the condenser lens has two, concave and convex lenses sequentially from the light source side.

13. A system according to claim 12, wherein said relay optical system has two convex lenses having the same shape.

14. A system according to claim 1, wherein letting $f_1$ be a focal length of the condenser lens in the main scanning plane, and $f_2$ be the focal length of said relay optical system in the main scanning plane, a condition given by $$0.2 \leq \frac{f_2}{f_1} \leq 1.0$$

is satisfied.

15. A system according to claim 14, wherein spherical aberration generated in said relay optical system is canceled by the condenser lens.

16. A system according to claim 15, wherein said relay optical system has a one-unit structure.

17. A system according to claim 16, wherein the condenser lens has two, concave and convex lenses sequentially from the light source side.

18. A system according to claim 17, wherein said relay optical system has two convex lenses having the same shape.

19. A system according to claim 14, wherein curvature of field generated in said relay optical system is canceled by the condenser lens.

20. A system according to claim 19, wherein said relay optical system has a one-unit structure.

21. A system according to claim 20, wherein the condenser lens has two, concave and convex lenses sequentially from the light source side.

22. A system according to claim 21, wherein said relay optical system has two convex lenses having the same shape.

23. A multi-beam optical scanning apparatus using said multi-beam light scanning optical system of any one of claims 1 to 13.

24. An image forming apparatus comprising:
said multi-beam optical scanning apparatus of claim 23;
a photosensitive member arranged on a surface to be scanned;
a developer for developing, as a toner image, an electrostatic latent image formed on said photosensitive member by each of the light beams scanned by said multi-beam optical scanning apparatus;
a transfer device for transferring the developed toner image onto a transfer member; and
a fixing device for fixing the transferred toner image on the transfer member.

25. An image forming apparatus comprising:
said multi-beam optical scanning apparatus of claim 23; and
a printer controller for converting code data received from an external device into an image signal and outputting the image signal to said multi-beam optical scanning apparatus.

26. A multi-beam light scanning optical system having a light beam incident optical system for causing a condenser lens to condense each of light beams emitted from a plurality of light sources separated at least in a main scanning direction and making the light beams incident on a deflecting surface of an optical deflector,
wherein in said light beam incident optical system, a relay optical system is inserted between the plurality of light sources and the condenser lens,
an aperture stop for limiting a beam width of each of the light beams emitted from the plurality of light sources is arranged on a light source side with respect to an image forming point of each of the plurality of light sources through said relay optical system,
the condenser lens makes said aperture stop conjugate to the deflecting surface of the optical deflector,
said relay optical system forms images of the plurality of light sources in not more than a one-to-one size, and
letting $f_1$ be a focal length of the condenser lens in the main scanning plane, $f_2$ be a focal length of said relay optical system in the main scanning plane, $\beta_2$ be an imaging magnification of said relay optical system in the main scanning plane, and d be a distance from a rear principal point of said relay optical system to said condenser lens, conditions given by $$0.75 \leq \frac{f_2}{d} \leq 3.0$$

$$0.2 \leq \frac{f_2}{f_1} \leq 1.0$$

$$0.25 \leq \beta_2 \leq 1.0$$

is satisfied.

27. A multi-beam optical scanning apparatus using said multi-beam light scanning optical system of claim 26.

28. An image forming apparatus comprising:
said multi-beam optical scanning apparatus of claim 27;
a photosensitive member arranged on a surface to be scanned;
a developer for developing, as a toner image, an electrostatic latent image formed on said photosensitive member by each of the light beams scanned by said multi-beam optical scanning apparatus;
a transfer device for transferring the developed toner image onto a transfer member; and
a fixing device for fixing the transferred toner image on the transfer member.

29. An image forming apparatus comprising:
said multi-beam scanning apparatus of claim 27; and
a printer controller for converting code data received from an external device into an image signal and outputting the image signal to said multi-beam optical scanning apparatus.

30. A multi-beam light scanning optical system having a light beam incident optical system for causing a condenser lens to condense each of light beams emitted from a plurality of light sources separated at least in a main scanning direction and making the light beams incident on a deflecting surface of an optical deflector,
wherein in said light beam incident optical system, a relay optical system is inserted between the plurality of light sources and the condenser lens, an aperture stop for limiting a beam width of each of the light beams emitted from the plurality of light sources is arranged on a light source side with respect to an image forming point of each of the plurality of light sources through said relay optical system, the condenser lens makes said aperture stop conjugate to the deflecting surface of the optical deflector, said relay optical system forms images of the plurality of light sources in not more than a one-to-one size, letting $f_1$ be a focal length of the condenser lens in the main scanning plane, $f_2$ be a focal length of said relay optical system in the main scanning plane, $\beta_2$ be an imaging magnification of said relay optical system in the main scanning plane, and d be a distance from a rear principal point of said relay optical system to said condenser lens, conditions given by $$0.75 \leq \frac{f_2}{d} \leq 3.0$$
$$0.2 \leq \frac{f_2}{f_1} \leq 1.0$$
$$0.25 \leq \beta_2 \leq 1.0$$

is satisfied, and spherical aberration and curvature of field in the main scanning plane generated in said relay optical system are canceled by the condenser lens.

31. A multi-beam optical scanning apparatus which uses said multi-beam light scanning optical system of claim 30.

32. An image forming apparatus comprising:

said multi-beam optical scanning apparatus of claim 31;

a photosensitive member arranged on a surface to be scanned;

a developer for developing, as a toner image, an electrostatic latent image formed on said photosensitive member by each of the light beams scanned by said multi-beam optical scanning apparatus;

a transfer device for transferring the developed toner image onto a transfer member; and a fixing device for fixing the transferred toner image on the transfer member.

33. An image forming apparatus comprising:

said multi-beam optical scanning apparatus of claim 31; and a printer controller for converting code data received from an external device into an image signal and outputting the image signal to said multi-beam optical scanning apparatus.

* * * * *

UNITED STATES PATENT AND TRADEMARK OFFICE
CERTIFICATE OF CORRECTION

PATENT NO. : 6,989,855 B2 Page 1 of 1
APPLICATION NO. : 09/967965
DATED : January 24, 2006
INVENTOR(S) : Yoshihiro Ishibe It is certified that error appears in the above-identified patent and that said Letters Patent is hereby corrected as shown below:

COLUMN 16
    Line 47, "optical" should read --relay optical--.

COLUMN 17
    Line 55, "1 to 13" should read --1 to 22--.

Signed and Sealed this

Fifth Day of September, 2006

JON W. DUDAS
*Director of the United States Patent and Trademark Office*